US012675585B2

(12) United States Patent
Pan et al.

(10) Patent No.: US 12,675,585 B2
(45) Date of Patent: Jul. 7, 2026

(54) METHODS, APPARATUSES AND SYSTEMS FOR OBTAINING DATA AUTHORIZATION

(71) Applicant: Alipay (Hangzhou) Information Technology Co., Ltd., Hangzhou (CN)

(72) Inventors: Wuqiong Pan, Hangzhou (CN); Tao Wei, Hangzhou (CN); Tingting Li, Hangzhou (CN); Zhongtian Qian, Hangzhou (CN); Tianyi Li, Hangzhou (CN); Zhenqiang Wei, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 105 days.

(21) Appl. No.: 18/400,402

(22) Filed: Dec. 29, 2023

(65) Prior Publication Data

US 2024/0135008 A1     Apr. 25, 2024

Related U.S. Application Data

(63) Continuation of application No. PCT/CN2022/125724, filed on Oct. 17, 2022.

(30) Foreign Application Priority Data

Dec. 23, 2021     (CN) ......................... 202111585885.2

(51) Int. Cl.
*G06F 21/60*         (2013.01)
(52) U.S. Cl.
CPC .................................. *G06F 21/602* (2013.01)
(58) Field of Classification Search
CPC .................................................... G06F 21/602
See application file for complete search history.

(56) References Cited

U.S. PATENT DOCUMENTS 8,788,805 B2     7/2014   Herne et al.
2005/0132182 A1   6/2005   Challener et al.
(Continued)

FOREIGN PATENT DOCUMENTS

CN     109493042     3/2019
CN     110011956     7/2019
(Continued)

OTHER PUBLICATIONS

Extended European Search Report in European Appln. No. 22909465. 1, mailed on Nov. 19, 2024, 9 pages.
(Continued)

*Primary Examiner* — Ayoub Alata
(74) *Attorney, Agent, or Firm* — Fish & Richardson P.C.

(57)         ABSTRACT

Computer-implemented methods, apparatuses and systems for obtaining data authorization are described. In an example method, a first computing node in a trusted computing center receives an authentication request from a first provider. Authentication information is returned to the first provider, where the authentication information comprises a first code hash of a first computing logic running in the first computing node. A channel establishment request sent by the first provider is received after determining that the first computing node passes trusted authentication and the first code hash passes correctness verification. A first trusted channel is established between the first provider and the first computing node according to the channel establishment request. A target encryption key is received through the first trusted channel, thereby authorization to perform computation on a target encrypted shard corresponding to the target encryption key based on the first computing logic is obtained.

20 Claims, 9 Drawing Sheets

(56)                References Cited

U.S. PATENT DOCUMENTS

| | | | | |
|---|---|---|---|---|
| 2009/0220080 A1* | 9/2009 | Herne | ................. | H04L 63/0428 |
| | | | | 380/255 |
| 2021/0152343 A1 | 5/2021 | Yu et al. | | |
| 2021/0218717 A1* | 7/2021 | Hill | ....................... | H04L 9/0822 |
| 2021/0273921 A1* | 9/2021 | Kumar | ................. | H04L 9/3247 |

FOREIGN PATENT DOCUMENTS

| | | |
|---|---|---|
| CN | 110034924 A | 7/2019 |
| CN | 110677240 | 1/2020 |
| CN | 110750803 | 2/2020 |
| CN | 111064569 | 4/2020 |
| CN | 111222165 | 6/2020 |
| CN | 111291381 | 6/2020 |
| CN | 111737724 | 10/2020 |
| CN | 113449292 | 9/2021 |
| CN | 113987554 | 1/2022 |
| CN | 114944960 | 8/2022 |
| CN | 115550070 | 12/2022 |
| CN | 116561820 | 8/2023 |
| EP | 4345670 | 4/2024 |
| WO | WO 2020/098377 | 5/2020 |
| WO | WO 2023/169081 | 9/2023 |

OTHER PUBLICATIONS

International Preliminary Report on Patentability in International Appln. No. PCT/CN2022/125724, mailed on Jul. 4, 2024, 12 pages (with English translation).

Aliyun.com [online], "Create a managed cluster for cryptographic computing," available on or before Sep. 27, 2023, via Internet Archive: Wayback Machine URL<https://web.archive.org/web/20240000000000*/https://help.aliyun.com/zh/ack/ack-managed-and-ack-dedicated/user-guide/create-an-ack-managed-cluster-for-confidential-computing>, retrieved on Jun. 17, 2024, URL<https://help.aliyun.com/zh/ack/ack-managed-and-ack-dedicated/user-guide/create-an-ack-managed-cluster-for-confidential-computing>, 71 pages (with English translation).

Huang et al., "Analysis and Improvement of Delegation Mechanism in a Trusted Computing Platform," Geomatics and Information Science of Wuhan University. May 5, 2010, 35(5):599-602 (with English Abstract only).

International Search Report and Written Opinion in International Appln. No. PCT/CN2022/125724, mailed on Jan. 11, 2023, 9 pages (with machine translation).

Li et al., "New design of public key infrastructure based on NTRUSign," Application Research of Computers, Nov. 28, 2018, 6 pages (with English Abstract).

Siris et al., "IoT Resource Access utilizing Blockchains and Trusted Execution Environments," In 2019 Global IoT Summit (GIoTS), Jun. 17, 2019, p. 1-6.

Zhang et al., "A Cloud Storage Encrypted Data Deduplication Method Based on Authorization Records," Netinfo Security, 2020, 20(3): 75-82 (with English Abstract).

* cited by examiner

METHODS, APPARATUSES AND SYSTEMS FOR OBTAINING DATA AUTHORIZATION

CROSS-REFERENCE TO RELATED APPLICATIONS

This application is a continuation of PCT Application No. PCT/CN2022/125724, filed on Oct. 17, 2022, which claims priority to Chinese Patent Application No. 202111585885.2, filed on Dec. 23, 2021, and each application is hereby incorporated by reference in its entirety.

TECHNICAL FIELD

One or more example embodiments of the present disclosure relate to the field of security technologies, and in particular, to methods, apparatuses and systems for obtaining data authorization.

BACKGROUND ART

Confidential computing refers to a data provider uploading data to a central server which performs computations on the data in encrypted form without requiring participation from the data provider. Confidential computing can be applied in many scenarios. For example, a data provider can provide data in encrypted form to a trading center. The trading center can compute valuable results in encrypted form and sell the results to data requesters. The data provider and trading center can then share the revenue generated.

In current confidential computing solutions, data providers usually cannot control the computation logic used at the central server. However, data providers may only want data to be used for machine learning training and other logics that leak little information, rather than logics like quantiles and segmentation that leak more information. In addition, since the central server may intentionally use intentionally constructed and different computation logic to infer the original data from the computation results, there is a need for a solution that can constrain the computation logic used at the trusted computing center.

SUMMARY

One or more example embodiments of the present disclosure describe methods, apparatuses and systems for obtaining data authorization that can constrain the computation logic used at a trusted computing center, thus ensuring the security of data providers' data.

In a first aspect, a method for obtaining data authorization is provided, comprising:

Any first computing node among the plurality of trusted computing nodes receiving an authentication request from the first provider;

Returning authentication information to the first provider, wherein the authentication information comprises at least a first code hash of a first computation logic running on the first computing node;

Receiving a channel establishment request sent by the first provider after determining that the first computing node has passed trusted authentication and the first code hash has passed correctness verification;

Establishing a first trusted channel with the first provider based on the channel establishment request;

Obtaining, via the first trusted channel, a target encryption key from the respective encryption keys corresponding to the plurality of encrypted shards, thereby obtaining authorization to compute the target encrypted shard corresponding to the target encryption key based on the first computation logic.

In a second aspect, a method for obtaining data authorization is provided, comprising:

Respective proxy nodes obtaining respective encryption keys corresponding to the plurality of encrypted shards from the first provider;

Any first proxy node among the respective proxy nodes sending an authentication request to a corresponding first computing node and receiving authentication information returned by the first computing node, wherein the authentication information comprises at least a first code hash of a first computation logic running on the first computing node;

The first proxy node performing trusted authentication on the first computing node based on the authentication information, and judging whether the first code hash has been verifiably stored;

In response to the trusted authentication passing and the first code hash having been verifiably stored, the first proxy node establishing a first trusted channel with the first computing node;

The first proxy node sending a target encryption key received by it to the first computing node via the first trusted channel;

The first computing node obtaining authorization to compute the target encrypted shard corresponding to the target encryption key based on the first computation logic.

In a third aspect, a method for obtaining data authorization is provided, comprising:

Obtaining a target encryption key from the respective encryption keys corresponding to the plurality of encrypted shards from the first provider;

Sending an authentication request to a corresponding first computing node;

Receiving authentication information returned by the first computing node, wherein the authentication information comprises at least a first code hash of a first computation logic running on the first computing node;

Performing, based on the authentication information, trusted authentication on the first computing node and judging whether the first code hash has been verifiably stored;

In response to the trusted authentication passing and the first code hash having been verifiably stored, establishing a first trusted channel with the first computing node;

Sending, via the first trusted channel, the target encryption key to the first computing node; thereby the first computing node obtaining authorization to compute the target encrypted shard corresponding to the target encryption key based on the first computation logic.

In a fourth aspect, an apparatus for obtaining data authorization is provided, comprising:

A receiving unit for receiving an authentication request from the first provider;

A sending unit for returning authentication information to the first provider, wherein the authentication information comprises at least a first code hash of a first computation logic running on the first computing node;

wherein the receiving unit is further configured to receive a channel establishment request sent by the first provider after determining that the first computing node has passed trusted authentication and the first code hash has passed correctness verification;

An establishing unit for establishing, based on the channel establishment request, a first trusted channel with the first provider;

wherein the receiving unit is further configured to obtain, via the first trusted channel, a target encryption key from the respective encryption keys corresponding to the plurality of encrypted shards, thereby obtaining authorization to compute the target encrypted shard corresponding to the target encryption key based on the first computation logic.

In a fifth aspect, a system for obtaining data authorization is provided, comprising:

Respective proxy nodes for obtaining respective encryption keys corresponding to the plurality of encrypted shards from the first provider;

Any first proxy node among respective proxy nodes for sending an authentication request to a corresponding first computing node and receiving authentication information returned by the first computing node, wherein the authentication information comprises at least a first code hash of a first computation logic running on the first computing node;

wherein the first proxy node is further configured to perform, based on the authentication information, trusted authentication on the first computing node and judge whether the first code hash has been verifiably stored;

wherein the first proxy node further is configured to, in response to the trusted authentication passing and the first code hash having been verifiably stored, establish a first trusted channel with the first computing node;

wherein the first proxy node is further configured to send a target encryption key received by it to the first computing node via the first trusted channel;

The first computing node for obtaining authorization to compute the target encrypted shard corresponding to the target encryption key based on the first computation logic.

In a sixth aspect, an apparatus for obtaining data authorization is provided, comprising:

An obtaining unit, configured to obtain a target encryption key from the respective encryption keys corresponding to the plurality of encrypted shards from the first provider;

A sending unit, configured to send an authentication request to a corresponding first computing node;

A receiving unit, configured to receive authentication information returned by the first computing node, wherein the authentication information comprises at least a first code hash of a first computation logic running on the first computing node;

A determination unit, configured to perform trusted authentication on the first computing node based on the authentication information, and determine whether the first code hash is verifiably stored;

An establishment unit, configured to establish a first trusted channel with the first computing node when the trusted authentication passes and the first code hash is verifiably stored;

The sending unit is further configured to send the target encryption key to the first computing node through the first trusted channel; thereby the first computing node obtains authorization to compute the target encrypted shard corresponding to the target encryption key based on the first computation logic.

In a seventh aspect, a computer storage medium is provided, storing a computer program which, when executed by a computer, causes the computer to perform the methods according to the first, second or third aspect.

In an eighth aspect, a computing device is provided, comprising a memory and a processor, wherein the memory stores executable code which, when executed by the processor, implements the methods according to the first, second or third aspect.

The method, apparatus and system for obtaining data authorization disclosed in one or more example embodiments of the present disclosure propose two ways to constrain the computation logic used at a trusted computing center. In one approach, the data provider reviews the computation logic in advance and stores the code hash of the reviewed computation logic. Afterwards, the data provider can obtain the code hash of the computation logic running on the trusted computing node, and provide the encryption key of the data to the trusted computing node to achieve data authorization if the obtained code hash is consistent with the stored code hash. In the other approach, the trusted computing node verifiably stores the code hash of the computation logic running on it in advance at a verifiable storage center. Afterwards, the proxy node of the trusted computing node can obtain the code hash of the computation logic running on the trusted computing node, and provide the encryption key of the data obtained in advance from the data provider to achieve data authorization if the obtained code hash is consistent with the verifiably stored code hash. In this approach, the data provider can obtain the code hash from the verifiable storage center and review the corresponding computation logic for legitimacy based on the code hash.

BRIEF DESCRIPTION OF DRAWINGS

In order to more clearly illustrate the technical solutions in the embodiments of the present disclosure, the drawings to be used in the description of the embodiments are briefly introduced below. Apparently, the drawings in the following descriptions are only some embodiments of the present disclosure. For those of ordinary skill in the art, other drawings can be obtained without creative efforts based on these drawings.

DETAILED DESCRIPTION

The solutions provided in the present disclosure are described below with reference to the accompanying drawings.

The solutions proposed in the embodiments of the present disclosure propose a scheme to constrain the computation logic used by the center when computing data providers' data using Trusted Cryptographic Computing (TECC).

TECC is a secure and efficient confidential computing method that can compute a common result for multiple data providers without leaking any party's data. Trusted confidential computing combines both system security and cryptography technologies to better balance security and performance than using only one technology, ultimately achieving the ideal state of "sufficient security and very fast performance".

Cryptography can be used to construct mathematically provably secure schemes, but such schemes tend to have poor computational performance. Due to inherent properties of mathematics, it is difficult to improve to an ideal state that meets the requirements of most scenarios. Therefore, we seek a "sufficient but not strictly mathematically provable" solution. Trusted security technologies represented by TEE (Trusted Execution Environment) have significantly better security than common operating systems because they rely on less code for security. This is a viable approach. However, practice has proven that TEEs can still be compromised. TECC combines both approaches, so that when the TEE is compromised, security is still guaranteed, meeting the requirements of the vast majority of scenarios. On the other hand, TECC also inherits the high performance characteristic of trusted technologies, and with reasonable resource expansion, can achieve performance approximating plaintext computation.

Figure 1:
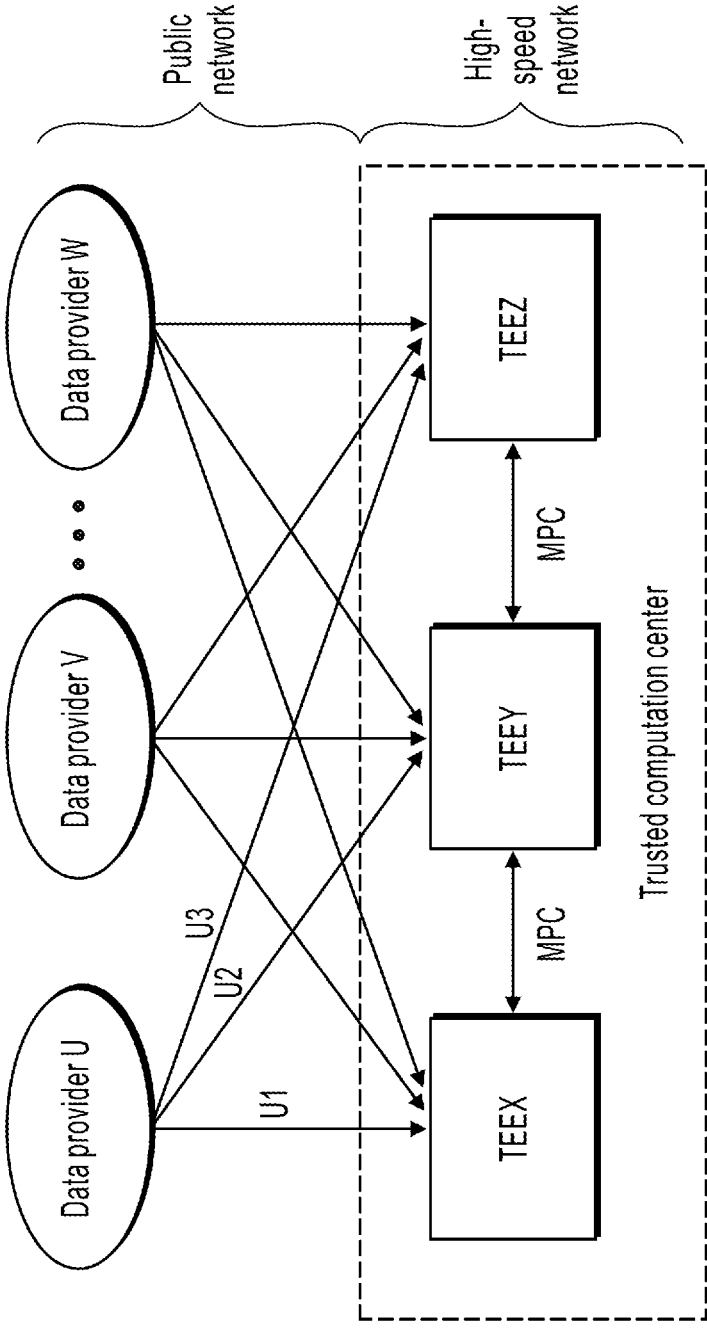
FIG. 1 shows a schematic diagram of TECC according to an embodiment.

FIG. 1 shows a schematic diagram of TECC according to an embodiment. In FIG. 1, the data provider U randomly splits the data into multiple data shards locally: U1, U2 and U3. 2) The data provider U establishes secure channels with multiple TEEs and sends each data shard to a separate TEE. For example, U1, U2 and U3 are sent to TEEX, TEEY and TEEZ respectively. Other data providers can also send their respective data shards to separate TEEs. 3) After acquiring all data shards from data providers, each TEE executes MPC (Secure Multi-Party Computation) protocols based on secret sharing to complete the computation.

It should be noted that in TECC, the data provider can use TEE technology to ensure their data only exist within the TEE, and the TEE's host, owner, etc. cannot access the plaintext data (if the TEE is not compromised). On the other hand, each TEE only ever touches a data shard, so even if an attacker compromises a TEE and steals or modifies long-term, they cannot obtain valid information. In practice, this level of defense is almost unbreakable. TECC's high performance mainly stems from very little public network interaction, generally only once. With data pre-uploaded, public network interaction may not even be needed. Another reason is that TECC supports high concurrency, allowing it to achieve near-plaintext performance with reasonable resource expansion.

Figure 2:
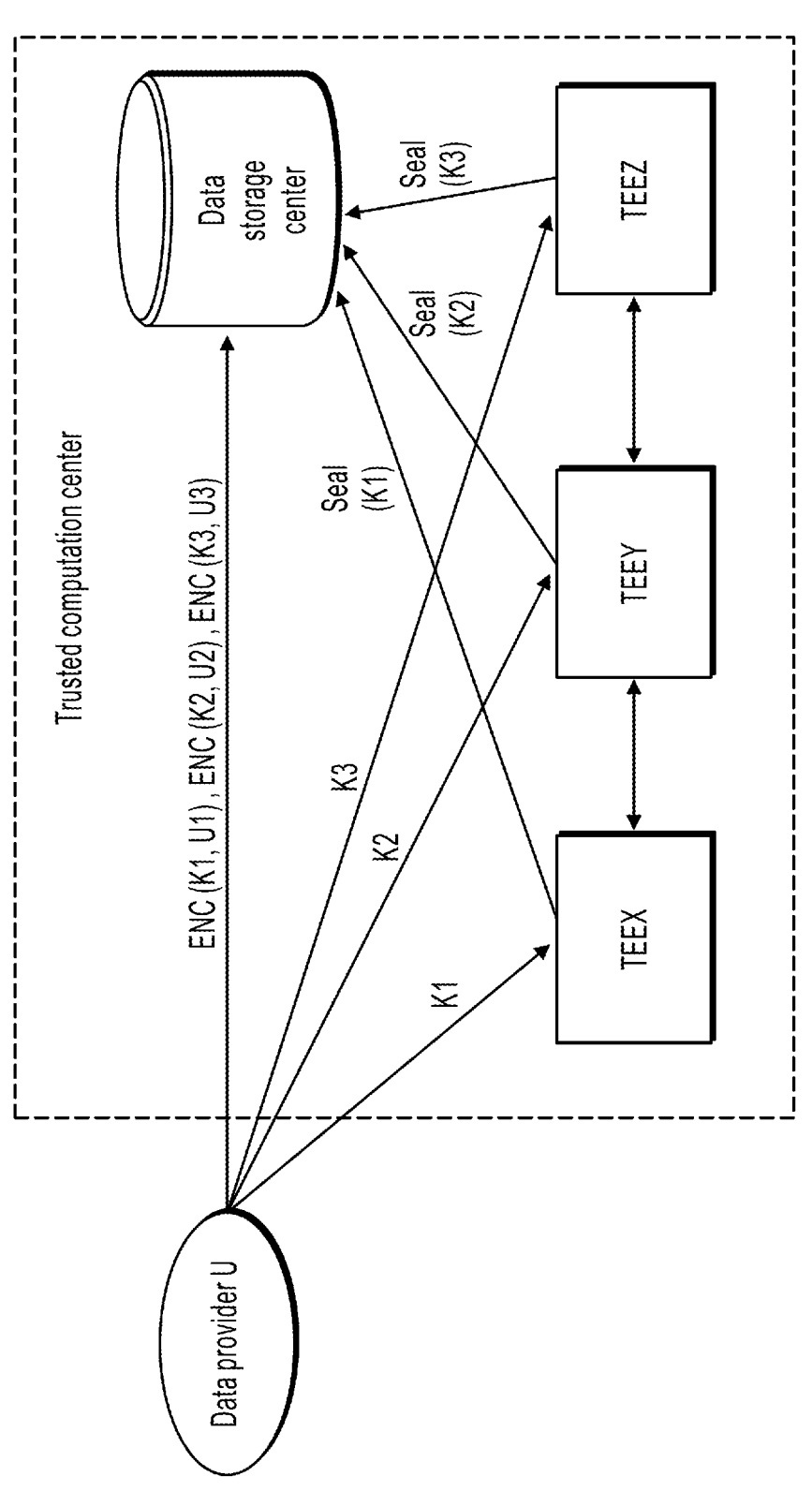
FIG. 2 shows a schematic diagram of an application scenario disclosed in an embodiment of the present disclosure.

FIG. 2 shows a schematic diagram of an application scenario disclosed in an embodiment of the present disclosure. In FIG. 2, the data provider U can upload encrypted data to the trusted computing center, and the trusted computing center can compute the encrypted data based on a computation logic. Here, the data provider U can be implemented as any device, platform, server or cluster with computing and processing capabilities. The trusted computing center can include a data storage center and three trusted computing nodes, denoted as: TEEX, TEEY and TEEZ. In addition, the trusted computing center can also include a code storage center and a management center. The code storage center is used to store the computation logic operated on at each trusted computing node. The management center is used to manage each trusted computing node.

Specifically, the data provider U can split the corresponding private data into three private shards denoted as: U1, U2 and U3, and generate three random encryption keys corresponding to the three private shards: K1, K2 and K3. Afterwards, the data provider U can use the three encryption keys to encrypt the three private shards and obtain three encrypted shards denoted as: ENC(K1, U1), ENC(K2, U2), ENC(K3, U3), and upload the three encrypted shards to the data storage center of the trusted computing center respectively.

After uploading each encrypted shard, the data provider U can review any computation logic, save the code hash of the reviewed computation logic, and obtain the code hashes of the computation logics running on TEEX, TEEY and TEEZ respectively. If the obtained code hashes are consistent with the saved code hashes, the data provider U provides the encryption keys K1, K2 and K3 to TEEX, TEEY and TEEZ respectively, so that TEEX, TEEY and TEEZ obtain the authorization to compute U1, U2 and U3 based on their respective running computation logics. That is, each TEE obtains the corresponding data authorization.

In addition, TEEX, TEEY and TEEZ can also use their respective private keys to encrypt K1, K2 and K3 respectively, obtaining Seal(K1), Seal(K2) and Seal(K3), and store their respective encrypted encryption keys in the data storage center for subsequent joint computation.

It should be noted that since the data provider U provides the encryption keys to each TEE only when the obtained code hashes are consistent with the saved code hashes, and the computation logic corresponding to the saved code hash has been reviewed by the data provider U, the computation logic used at the trusted computing center can be constrained or controlled.

Likewise, other data providers can also upload their respective encrypted shards to the trusted computing center, and provide the corresponding encryption keys to each TEE if the obtained code hashes are consistent with the saved code hashes. This is not repeated here.

In addition, it should be understood that FIG. 2 is just an exemplary illustration. In actual applications, the number of TEEs can also be two or more, and accordingly, the data can be split into two private shards or more. Also, the number of encryption keys can be different from the number of TEEs, but equal to the number of TEE role categories, so that TEEs of the same role category share the same encryption key.

Figure 3:
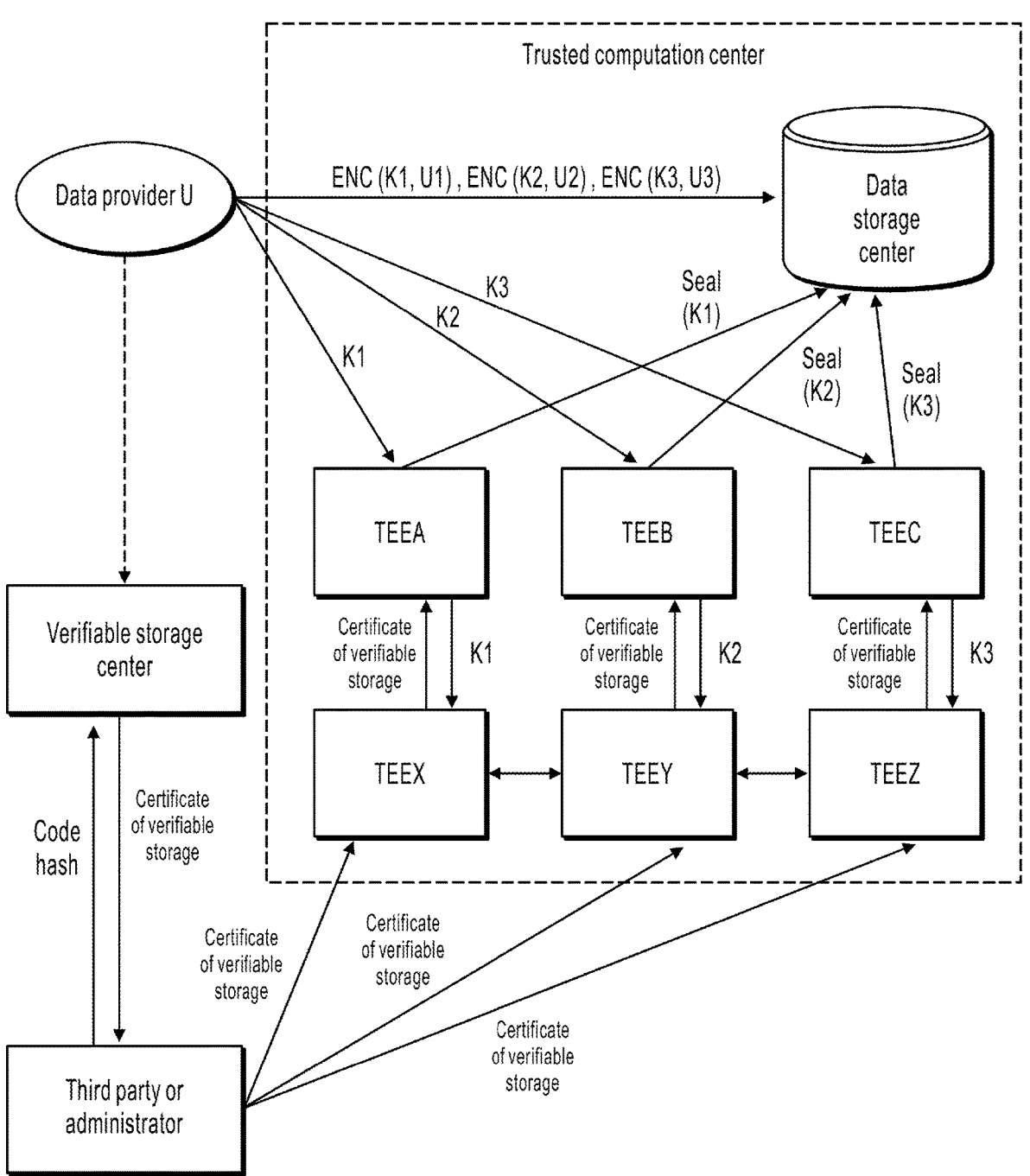
FIG. 3 shows a schematic diagram of another application scenario disclosed in an embodiment of the present disclosure.

FIG. 3 shows a schematic diagram of another application scenario disclosed in an embodiment of the present disclosure. In FIG. 3, the data provider U can upload encrypted data to the trusted computing center, and the trusted computing center can compute on the encrypted data based on a computation logic. Here, the data provider U can be implemented as any device, platform, server or cluster with computing and processing capabilities. The trusted computing center can include a data storage center and three trusted computing nodes and their respective proxy nodes. The three trusted computing nodes are denoted as TEEX, TEEY and TEEZ, and their corresponding proxy nodes are denoted as TEEA, TEEB and TEEC respectively. In addition, the trusted computing center can also include a code storage center and a management center. The code storage center is used to store the computation logic operated on at each trusted computing node. The management center is used to manage each trusted computing node.

Specifically, the data provider U can split the corresponding private data into three private shards denoted as U1, U2 and U3, and generate three random encryption keys corresponding to the three private shards: K1, K2 and K3. Afterwards, the data provider U can use the three encryption keys to encrypt the three private shards and obtain three encrypted shards denoted as ENC(K1, U1), ENC(K2, U2), ENC(K3, U3), and upload the three encrypted shards to the data storage center of the trusted computing center respectively.

In addition, the data provider U can also send the encryption keys K1, K2 and K3 to TEEA, TEEB and TEEC respectively. TEEA, TEEB and TEEC can then use their respective private keys to encrypt K1, K2 and K3 respectively, obtaining Seal(K1), Seal(K2) and Seal(K3), and store their respective encrypted encryption keys in the data storage center for subsequent authorization of the corresponding trusted computing nodes. TEEX, TEEY and TEEZ can verifiably store the code hashes of the computation logics running on them at a verifiable storage center in advance.

Afterwards, each proxy node can obtain from the corresponding trusted computing node the code hash of the running computation logic and its verifiably stored hash. If the running code hash matches the verifiably stored hash, the proxy node provides the encryption keys K1, K2 and K3 to TEEX, TEEY and TEEZ respectively, so that TEEX, TEEY and TEEZ obtain the authorization to compute U1, U2 and U3 based on their respective running computation logics. That is, each trusted computing node obtains the corresponding data authorization.

The data provider U can obtain the verifiably stored code hashes of each trusted computing node from the verifiable storage center at any time, and then review the corresponding computation logic pulled from the code storage center based on the obtained code hashes. That is, the data provider U reviews the computation logic used at the trusted computing center afterwards, which also enables constraint or control over the computation logic used at the trusted computing center. Moreover, this post hoc review avoids frequent interaction between the data provider and the trusted computing center.

Similarly, other data providers can also upload their respective encrypted shards to the trusted computing center, and provide the corresponding encryption keys to each trusted computing node if the obtained code hashes match the verifiably stored hashes. This is not repeated here.

It should be understood that FIG. 3 is just an exemplary illustration. In actual applications, the number of trusted computing nodes can also be two or more. Accordingly, the data can also be split into two private shards or more. In addition, the number of proxy nodes does not have to equal the number of trusted computing nodes. For example, multiple trusted computing nodes can correspond to one proxy node. Finally, the trusted computing node and proxy node can be merged into one, so that the data provider U performs the verification of the verifiably stored code hash, etc. This is not limited herein.

In summary, in the above two scenarios, the computation logic used at the trusted computing center can be constrained and controlled, thus ensuring the security of the data providers' data.

The above two application scenarios show that the data provider authorizes the encrypted data uploaded in advance. Therefore, the method of the data provider uploading encrypted data is explained first below.

Figure 4:
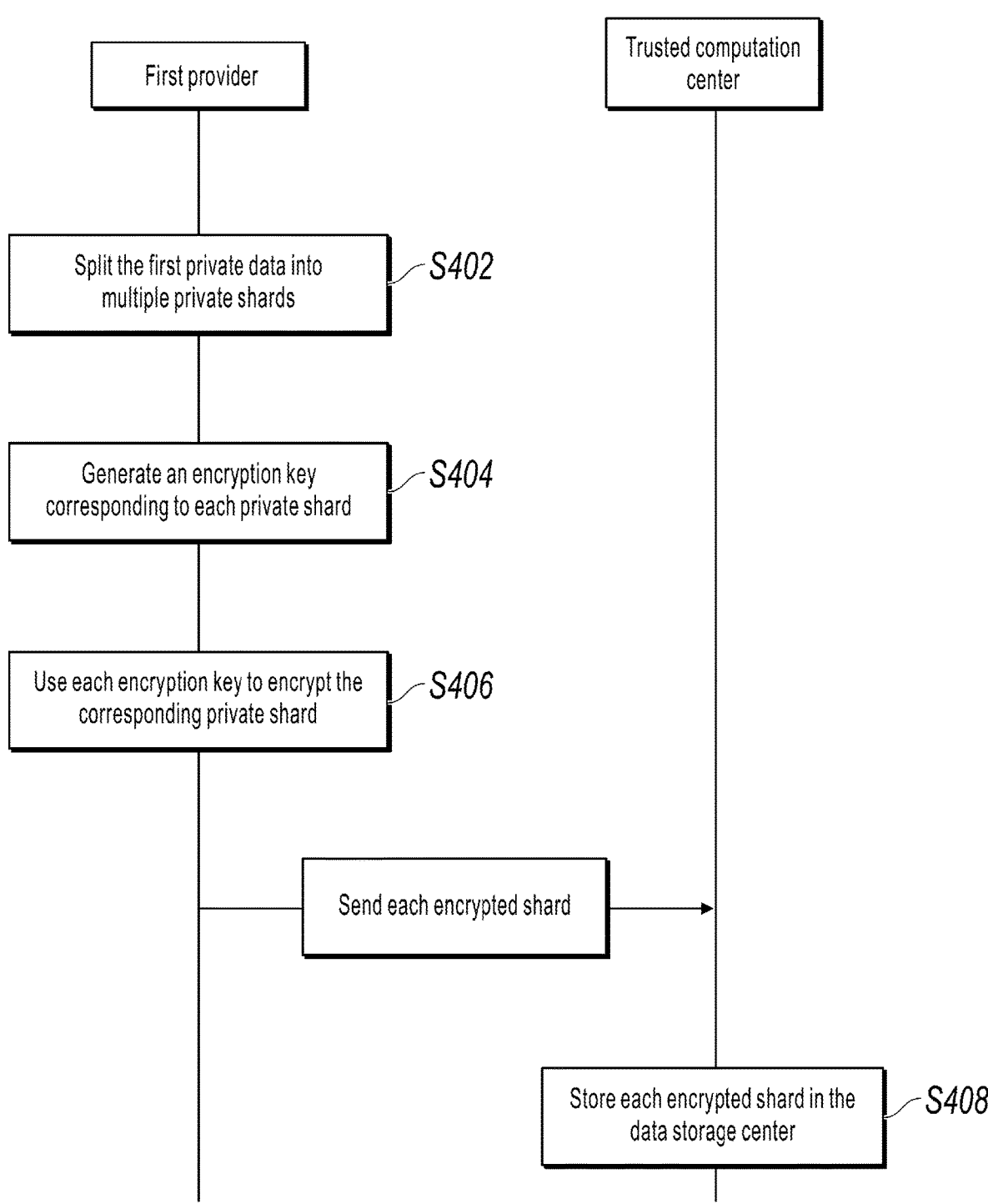
FIG. 4 shows an interaction diagram of a method for uploading encrypted data according to an embodiment.

FIG. 4 shows an interaction diagram of a method for uploading encrypted data according to an embodiment. In FIG. 4, the method can comprise at least the following steps:

Step 402: The first provider splits the first private data to be stored into multiple private shards.

In one example, the number of private shards can be determined based on the number of trusted computing nodes involved in secure multi-party computation. For example, in the scenarios of FIG. 2 or 3, assuming TEEX, TEEY and TEEZ are all involved in multi-party secure computation, the first private data can be split into three private shards denoted as U1, U2 and U3.

Step 404: The first provider generates an encryption key corresponding to each private shard.

For example, for the above three private shards U1, U2 and U3, the first provider can generate three random encryption keys: K1, K2 and K3.

Step 406: The first provider uses each encryption key to encrypt the corresponding private shard, and provides the obtained encrypted shards to the trusted computing center.

For example, U1 can be encrypted with K1 to obtain ENC(K1, U1), U2 can be encrypted with K2 to obtain ENC(K2, U2), and U3 can be encrypted with K3 to obtain ENC(K3, U3).

Of course, in actual applications, the first provider can also provide key identifiers corresponding to each encryption key to the first provider. In one example, the key identifier of any encryption key can be obtained by hash computation, so the key identifier is the hash value of the corresponding encryption key.

Step 408: The trusted computing center stores each encrypted shard in the data storage center.

When the trusted computing center also receives each key identifier, it can store the correspondence between each encrypted shard and key identifier. In one example, the correspondence can be as shown in Table 1.

TABLE 1

| ENC (K1, U1) | K1_ID |
|---|---|
| ENC (K2, U2) | K2_ID |
| ENC (K3, U3) | K3_ID |

Similarly, other data providers can also upload their respective encrypted shards to the trusted computing center for storage. And each data provider can upload encrypted shards corresponding to multiple data. Therefore, Table 1 can also include identifiers of data providers, identifiers of data, etc. This is not limited herein.

After the first provider uploads encrypted shards of any first private data to the trusted computing center, the first provider can control the computation logic used at the trusted computing center in two ways: first, autonomous control level; second, post hoc accountability level.

The first approach (autonomous control level) is explained first below using the application scenario shown in FIG. 2.

Figure 5:
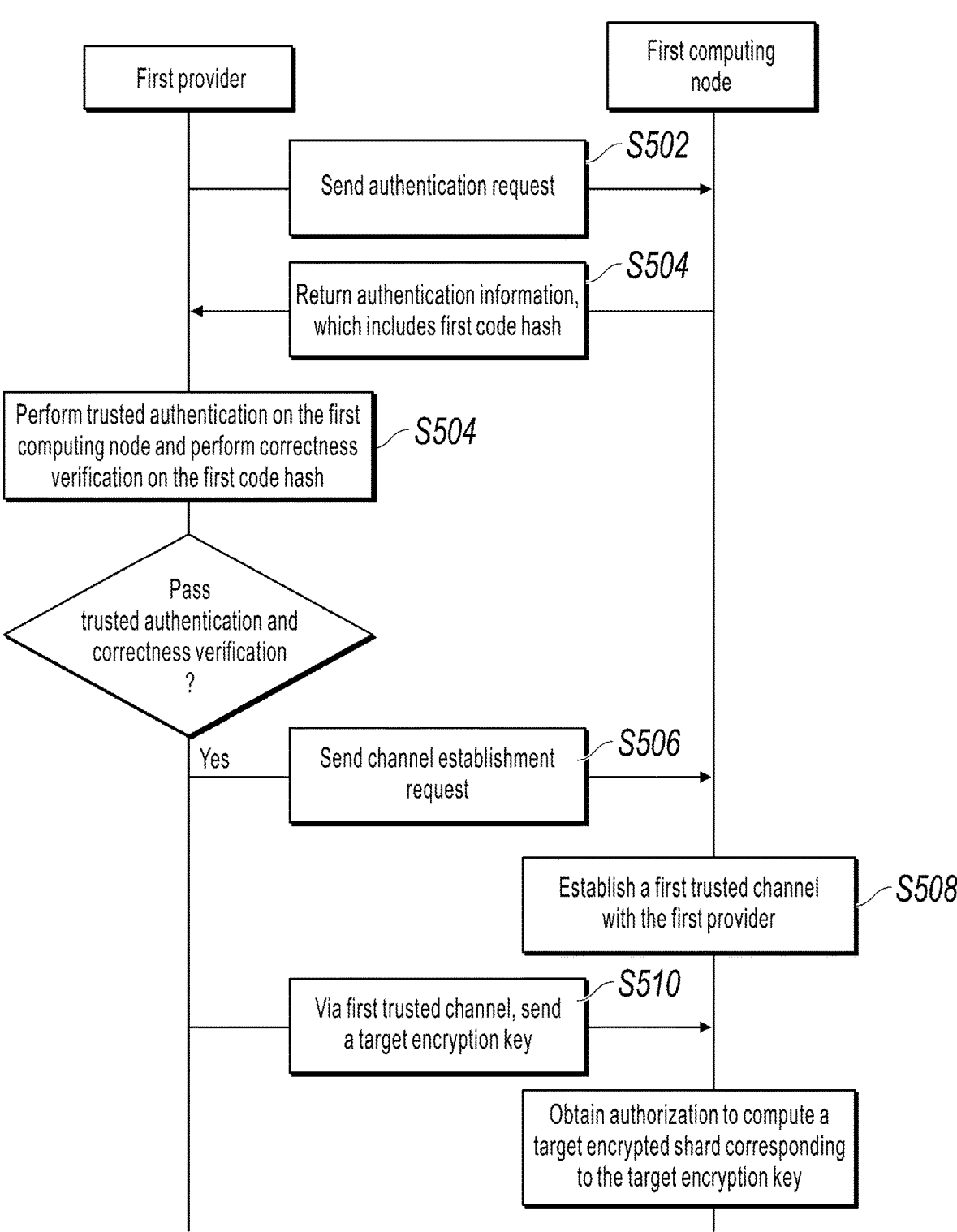
FIG. 5 shows an interaction diagram of a method for obtaining data authorization according to an embodiment.

In the first approach, the trusted computing center needs to interact with the data provider whenever the computation logic is changed, in order to obtain data authorization. The details are as follows:

FIG. 5 shows an interaction diagram of a method for obtaining data authorization according to an embodiment. As shown in FIG. 5, the method can comprise at least the following steps:

Step 502: Any first computing node among the plurality of trusted computing nodes receives an authentication request from the first provider.

Here, the first computing node can be a computing module or device with a certain isolation capability to ensure computational security. In one example, the first computing node is implemented as a trusted enclave. More specifically, the trusted enclave can be implemented using technologies like SGX or TrustZone. In other examples, the first computing node can be implemented in other forms, such as a virtual machine or running instance with security isolation mechanisms.

Taking FIG. 2 as an example, the above first computing node can be any node among TEEX, TEEY and TEEZ.

Step 504: Return authentication information to the first provider, wherein the authentication information comprises at least a first code hash of a first computation logic running on the first computing node.

Here, the first computation logic is program code, which can be used for computing average, maximum/minimum values, variance etc. Typically, if any line of code in the first computation logic changes, its corresponding code hash will differ. Thus, the first computation logic can be judged as expected or not based on the first code hash.

In addition, the above authentication information can also include signature information of the first computing node and the public key in the public/private key pair generated by the first computing node, etc. The signature information can be obtained through various signature methods such as hash algorithms, encryption algorithms, etc.

After receiving the above authentication information, the first provider can perform trusted authentication on the first computing node based on the authentication information. Here, the trusted authentication can include verifying the signature information and/or the public key in the public/private key pair, etc.

In addition, the first provider can also verify the correctness of the first code hash. This correctness verification can include comparing the first code hash with a target code hash of a target computation logic that is pre-stored and reviewed by the first provider. If the comparison result matches, the first code hash passes the correctness verification, otherwise it fails.

It should be understood that by comparing the received first code hash with the pre-stored target code hash, the first provider can review the first computation logic in real time, thereby constraining or controlling the computation logic used at the trusted computing center.

Step 506: Receive a channel establishment request sent by the first provider after determining that the first computing node has passed trusted authentication and the first code hash has passed correctness verification.

Step 508: Establish a first trusted channel with the first provider based on the channel establishment request.

The first trusted channel is also commonly referred to as an encrypted channel, which is typically established based on a regular connection.

Step 510: Obtain, via the first trusted channel, a target encryption key from the respective encryption keys corresponding to the plurality of encrypted shards, thereby obtaining authorization to compute the target encrypted shard corresponding to the target encryption key based on the first computation logic.

Taking FIG. 2 as an example, when the first computing node is TEEX, the received target encryption key can be K1; when the first computing node is TEEY, the received target encryption key can be K2.

It should be understood that after receiving the target encryption key, the first computing node can also determine, from the plurality of trusted computing nodes, a second computing node belonging to the same role category as the first computing node, and share the target encryption key with the second computing node, so that the second computing node obtains authorization to compute the target encrypted shard based on the first computation logic. This avoids the problem of the first provider having to send encryption keys to each trusted computing node, thus wasting communication resources.

In addition, after receiving the target encryption key, the first computing node can encrypt the target encryption key using a private key corresponding to the first computing node and the first computation logic. The encrypted target encryption key can be stored in the data storage center. The data storage center can record the correspondence between each trusted computing node and its respectively encrypted encryption key.

The first computing node in the present disclosure provides a Seal capability, where the Seal capability refers to encrypting using private keys of the trusted computing node. Such private keys are inaccessible outside the TEE.

It should be noted that the above private key is usually related to the device environment (e.g. CPU, memory, etc.) and computation logic. That is, different private keys will correspond to different device environments or computation logics. This ensures that when each trusted computing node runs the same computation logic, each trusted computing node can only decrypt the encryption key encrypted by it, and thus only obtain authorization to compute the private shard corresponding to the encryption key. This guarantees data security.

Taking FIG. 2 as an example, when TEEX, TEEY and TEEZ all run the same computation logic, the private keys they use to encrypt the respectively received encryption keys K1, K2 and K3 are different, because different trusted computing nodes usually have different device environments.

Of course, after receiving the target encryption key, the first computing node can also directly keep it in memory instead of storing it to the data storage center.

It should be understood that the above describes the process of each trusted computing node obtaining data authorization.

It should be noted that each time the trusted computing center (i.e. each trusted computing node) changes the computation logic, steps 502-510 are executed repeatedly to obtain data authorization for the current computation logic.

In addition, since the amount of transmission between the data provider and the trusted computing node during the process of obtaining data authorization is independent of the data provider's data size, and is usually a small constant, this solution can help reduce the usage costs for the data provider's data.

It should be understood that after obtaining data authorization, each trusted computing node can jointly compute the respective authorized plaintext shards. The computation process is explained below.

First for the case where the target encryption key is saved to the data storage center:

Taking the above first computing node as an example, the first computing node can receive a computation request from the management center. In response to the computation request, by querying the correspondence between each trusted computing node and its respectively encrypted encryption key, the first computing node can read the encrypted target encryption key from the data storage center, and decrypt it using the decryption key corresponding to the private key, to obtain the target encryption key. Based on the key identifier of the target encryption key, the first computing node can read the corresponding target encrypted shard from the data storage center, decrypt it using the target encryption key to obtain the corresponding target plaintext shard. The first computing node can then compute on the target plaintext shard and other plaintext shards based on the first computation logic.

First, in one example, the first computing node can read, from the data storage center, the target encryption key encrypted by it based on its corresponding node identifier.

Of course, the first computing node may also obtain identifiers of other trusted computing nodes in some way, and thus can obtain the encrypted encryption keys uploaded by other trusted computing nodes. However, since the first computing node cannot know the private keys of other trusted computing nodes, it cannot decrypt them. That is to say, in this solution, by using its private key to encrypt the corresponding target encryption key, the first computing node can ensure the security of the encryption key.

In addition, the above key identifier of the target encryption key can be computed by the first computing node using a hash algorithm agreed upon with the first provider on the target encryption key.

Next for the case where the target encryption key is directly kept in memory:

The first computing node can receive a computation request from the management center. In response to the computation request, based on the key identifier of the target encryption key, the first computing node can read the corresponding target encrypted shard from the data storage center, decrypt it using the target encryption key to obtain the corresponding target plaintext shard, and compute on the target plaintext shard and other plaintext shards based on the first computation logic.

Taking TEEX in FIG. 2 as an example, TEEX can read the encrypted shard ENC(U1, K1) from Table 1 based on the key identifier K1_ID of K1, then decrypt it using K1 to obtain the private shard U1. Similarly, TEEY can decrypt to obtain private shard U2, and TEEZ can decrypt to obtain private shard U3. TEEX, TEEY and TEEZ can then jointly compute on the private shards U1, U2 and U3 based on the first computation logic.

It should be understood that when TEEX, TEEY and TEEZ also obtain encryption keys of private shards from other data providers, the TEEs can also perform computation based on secret sharing.

In summary, in the method for obtaining data authorization provided in the embodiments of the present disclosure, the data provider reviews the computation logic used at the trusted computing center in real time by interacting with the trusted computing center, which constrains the computation logic used at the trusted computing center, thus ensuring the security of the data provider's data.

The second approach (post hoc accountability level) is explained below using the application scenario shown in FIG. 3 as an example.

Figure 6:
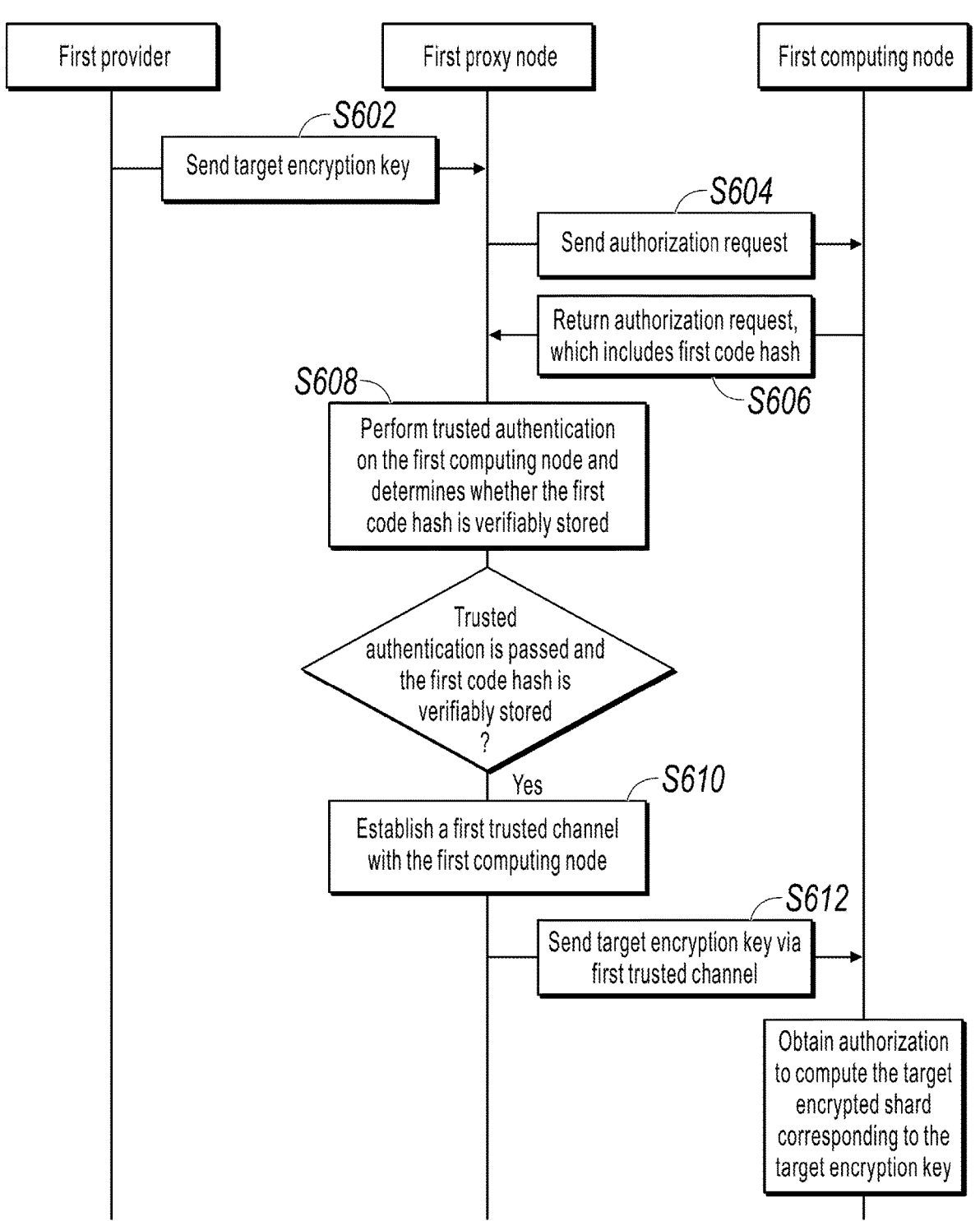
FIG. 6 shows an interaction diagram of a method for obtaining data authorization according to another embodiment.

In the second approach, the data provider and trusted computing center can agree on allowed computation logics by contract. So the trusted computing center does not need to interact with the data provider when changing the computation logic, but requires that the computation logic used by the trusted computing center be traceable in real time by the data provider. The details are as follows:

FIG. 6 shows an interaction diagram of a method for obtaining data authorization according to another embodiment. As shown in FIG. 6, the method can comprise at least the following steps:

Step 602: Any first proxy node among the proxy nodes obtains a target encryption key from the respective encryption keys corresponding to the plurality of encrypted shards from the first provider.

Optionally, before step 602, the first provider can first perform trusted authentication and correctness verification of code hash on the first proxy node. Here, the code hash corresponding to program code refers to the verification logic running on the first proxy node. The verification logic is used to determine whether a first code hash of a first computation logic running on the corresponding first computing node is verifiably stored.

The specific methods for trusted authentication and correctness verification can refer to steps 502 and 504, and are not repeated here.

After determining that the first proxy node has passed trusted authentication and the verification logic has passed correctness verification, the first provider can establish a trusted channel with the first proxy node and send the target encryption key to the first proxy node through the trusted channel.

Similarly, the first provider can establish trusted channels with other proxy nodes and send encryption keys to other proxy nodes.

Taking FIG. 3 as an example, after performing trusted authentication and correctness verification of code hashes on each proxy node TEEA, TEEB and TEEC, the first provider can send the encryption keys K1, K2 and K3 to each proxy node respectively. Thus, when the above first proxy node is TEEA, the received target encryption key is K1; and when the above first proxy node is TEEB, the received target encryption key is K2.

In addition, after receiving the target encryption key, the first proxy node can also encrypt the target encryption key using a private key corresponding to the first proxy node and the verification logic. The encrypted target encryption key can be stored in the data storage center. The data storage center can record the correspondence between each proxy node and its respectively encrypted encryption key.

Of course, after receiving the target encryption key, the first proxy node can also directly keep it in memory instead of storing it to the data storage center.

Step 604: The first proxy node sends an authentication request to the corresponding first computing node.

For example, when the first proxy node is TEEA, it can send an authentication request to the corresponding first computing node TEEX.

Step 606: The first proxy node receives authentication information returned by the first computing node, wherein the authentication information comprises at least a first code hash of a first computation logic running on the first computing node.

Here, the first computation logic is program code, which can be used for computing average, maximum/minimum values, variance etc. Typically, if any line of code in the first computation logic changes, its corresponding code hash will differ. Thus, the first computation logic can be judged as expected or not based on the first code hash.

In addition, the above authentication information can also include signature information of the first computing node and the public key in the public/private key pair generated by the first computing node, etc. The signature information can be obtained through various signature methods such as hash algorithms, encryption algorithms, etc.

Step 608: The first proxy node performs trusted authentication on the first computing node based on the authentication information, and determines whether the first code hash is verifiably stored.

Here, the trusted authentication can include verifying the signature information and/or the public key in the public/private key pair, etc.

The above determination of whether the first code hash is verifiably stored can include obtaining a certificate of verifiable storage that is pre-stored on the first computing node, which includes at least a second code hash of the first computation logic. The first code hash can be compared with the second code hash. If the comparison result matches, it can be determined that the first code hash is verifiably stored.

In one example, the process of the first computing node obtaining the certificate of verifiable storage can be: A trusted third party recognized by the trusted computing center (which can be any device or role) or an administrator provides the second code hash of the first computation logic to the verifiable storage center, and receives the certificate of verifiable storage returned by the verifiable storage center, which contains the second code hash. Afterwards, the trusted third party or administrator recognized by the trusted computing center provides the certificate of verifiable storage to the first computing node for storage.

Step 610: When the trusted authentication passes and the first code hash is verifiably stored, the first proxy node establishes a first trusted channel with the first computing node.

The first trusted channel is also commonly referred to as an encrypted channel, which is typically established based on a regular connection.

Step 612: The first proxy node sends the target encryption key to the first computing node through the first trusted channel, so that the first computing node obtains authorization to compute the target encrypted shard corresponding to the target encryption key based on the first computation logic.

When the target encryption key is stored in the data storage center, the first proxy node can query the correspondence between each proxy node and its respectively encrypted encryption key, and read, from the data storage center, the target encryption key encrypted by it. It can then decrypt it using the decryption key corresponding to the private key to obtain the plaintext target encryption key, and provide the target encryption key to the first computing node.

When the target encryption key is directly kept in memory, the first proxy node can directly read the target encryption key from memory and provide it to the first computing node.

Taking FIG. 3 as an example, when the first proxy node is TEEA, it can send the target encryption key K1 to the first computing node TEEX; when the first proxy node is TEEB, it can send the target encryption key K2 to the first computing node TEEY.

Similarly, after receiving the target encryption key, the first computing node can share it with other trusted computing nodes belonging to the same role category as the first computing node.

In addition, the first computing node can keep the target encryption key in memory, or store the target encryption key in the data storage center. The specific storage method refers to the storage method of the first proxy node for the target encryption key, which is not repeated here.

Thus, data authorization for each trusted computing node is completed.

It should be noted that each time the trusted computing center changes the computation logic, steps 604-612 are executed repeatedly to obtain data authorization for the current computation logic.

In addition, in this embodiment, since the data provider distributes the encryption keys to the proxy nodes in advance, the amount of transmission between the proxy nodes and trusted computing nodes during obtaining data authorization is independent of the data provider's data size, and is usually a small constant. Thus, this solution can help reduce usage costs for the data provider's data.

It should be understood that after obtaining data authorization, each trusted computing node can jointly compute their respective authorized plaintext shards. The computation process is explained below.

Taking the above first computing node as an example, the first computing node can receive a computation request from the management center. In response to the computation request, based on the key identifier of the target encryption key received from the first proxy node, the first computing node can read the corresponding target encrypted shard from the data storage center, decrypt it using the target encryption key to obtain the corresponding target plaintext shard, and compute on the target plaintext shard and other plaintext shards based on the first computation logic. The other plaintext shards can be obtained by other trusted computing nodes decrypting corresponding encrypted shards using their received encryption keys.

It should be understood that the above describes the case where the target encryption key is directly kept in memory. Of course, if the first computing node stores the target encryption key in the data storage center, it would first read and decrypt the encrypted target encryption key from the data storage center, and then read the target encrypted shard based on the key identifier of the decrypted target encryption key.

Taking TEEX in FIG. 3 as an example, TEEX can read the encrypted shard ENC(U1, K1) from Table 1 based on the key identifier K1_ID of K1, then decrypt it using K1 to obtain the private shard U1. Similarly, TEEY can decrypt to obtain private shard U2, and TEEZ can decrypt to obtain private shard U3. TEEX, TEEY and TEEZ can then jointly compute on the private shards U1, U2 and U3 based on the first computation logic.

It should be understood that when TEEX, TEEY and TEEZ also obtain encryption keys of private shards from other data providers, the TEEs can also perform computation based on secret sharing.

It should be understood that in the authorization method provided in this embodiment, the first provider did not review the computation logic used by the trusted computing center in real time, but made a determination on whether the code hash is verifiably stored. The review process is performed afterwards, and the specific post hoc process is as follows:

The first provider obtains from the verifiable storage center the second code hash verifiably stored by the first computing node, and sends a data retrieval request to the code storage center, which includes at least the above second code hash. In response to the data retrieval request, the code storage center provides the corresponding first computation logic to the first provider for the first provider to review the legitimacy of the first computation logic.

In one example, the first provider can perform the above legitimacy review based on the contract it signed with the trusted computing center. The contract is used to record the computation logics jointly agreed upon by both parties.

In summary, in the method for obtaining data authorization provided in the embodiments of the present disclosure, the data provider can review the computation logic used at the trusted computing center afterwards. This allows the trusted computing center to only interact twice when the data provider uploads the data shards and keys, and afterwards when the trusted computing center (i.e. each trusted computing node) changes the computation logic, interaction only needs to occur between the proxy nodes and trusted computing nodes, i.e. communication only occurs internally within the trusted computing center. The internal interaction of the trusted computing center is usually based on high-speed networks, which can greatly improve the efficiency of data authorization and achieve the goal of conserving communication resources.

In addition, in this embodiment, only the proxy nodes can obtain the encryption keys from the data provider. The proxy node will only send the encryption keys to the trusted computing node after verifying the certificate of verifiable storage of the trusted computing node, and the code hash of the trusted computing node is correct. In order for the trusted computing node to obtain the certificate of verifiable storage, it must verifiably store its code hash at the verifiable storage center. Thus, the data provider can obtain code hashes of all trusted computing nodes from the verifiable storage center, and know whether the computation logic matches the original agreement.

Figure 7:
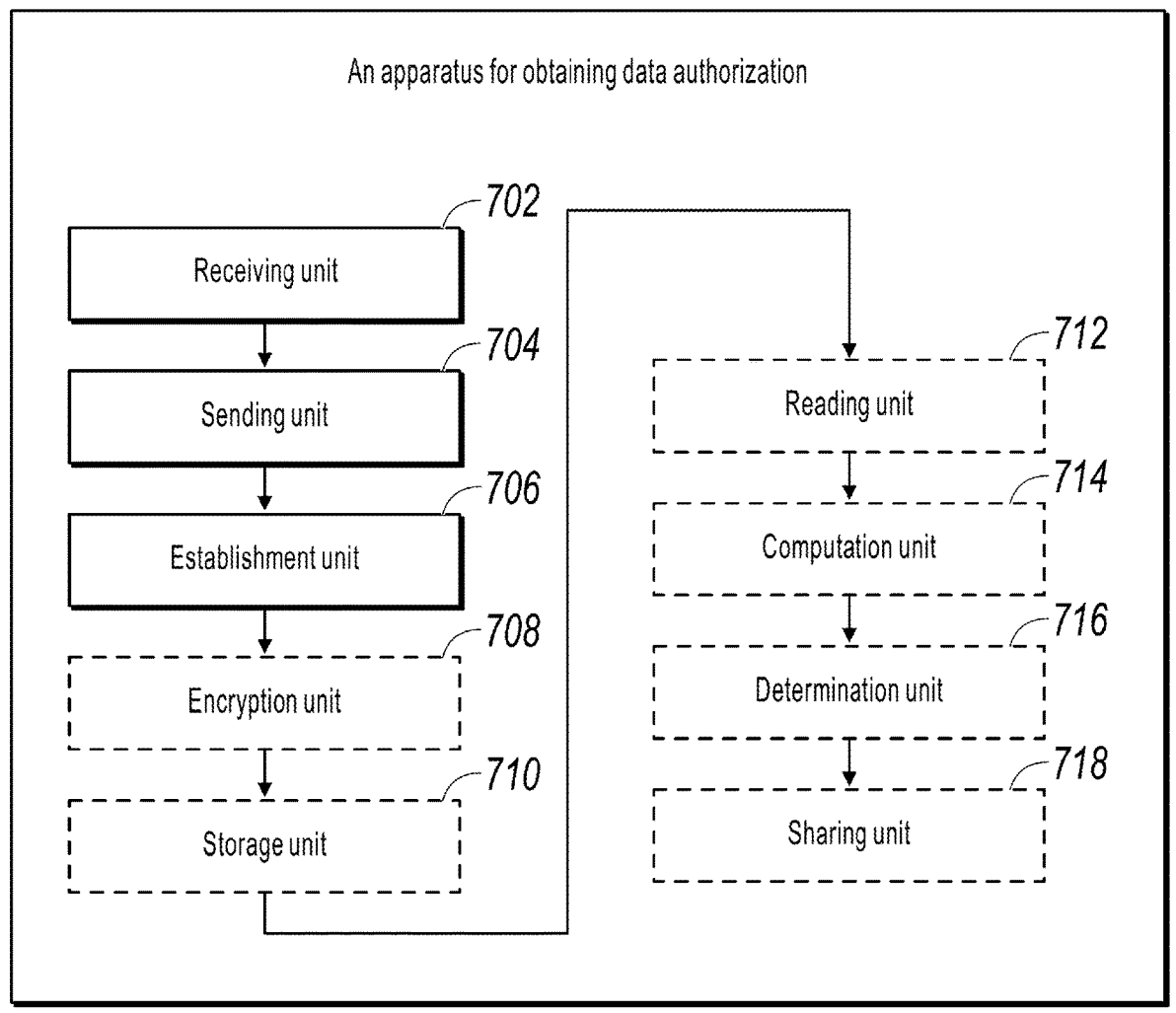
FIG. 7 shows a schematic diagram of an apparatus for obtaining data authorization according to an embodiment.

Corresponding to the above method for obtaining data authorization, an embodiment of the present disclosure also provides an apparatus for obtaining data authorization, disposed in any first computing node in the trusted computing center. As shown in FIG. 7, the apparatus can comprise:

A receiving unit 702, configured to receive an authentication request from the first provider.

A sending unit 704, configured to return authentication information to the first provider, wherein the authentication information comprises at least a first code hash of a first computation logic running on the first computing node.

The receiving unit 702 is further configured to receive a channel establishment request sent by the first provider after determining that the first computing node has passed trusted authentication and the first code hash has passed correctness verification.

Wherein the correctness verification comprises comparing the first code hash with a target code hash of a target computation logic that is pre-stored and reviewed by the first provider.

An establishment unit 706, configured to establish a first trusted channel with the first provider based on the channel establishment request.

The receiving unit 702 is further configured to obtain, via the first trusted channel, a target encryption key from the respective encryption keys corresponding to the plurality of encrypted shards, thereby obtaining authorization to compute the target encrypted shard corresponding to the target encryption key based on the first computation logic.

Optionally, the apparatus can also comprise:

An encryption unit 708, configured to encrypt the target encryption key using a private key corresponding to the first computing node and the first computation logic.

A storage unit 710, configured to store the encrypted target encryption key in the data storage center.

Optionally, the above trusted computing center also comprises a management center for managing the multiple trusted computing nodes. The above data storage center also maintains respective key identifiers corresponding to the multiple encrypted shards. The apparatus further comprises: a reading unit 712 and a computation unit 714.

The receiving unit 702 is further configured to receive a computation request from the management center.

The reading unit 712 is configured to, in response to the computation request, read the encrypted target encryption key from the data storage center, decrypt it using a decryption key corresponding to the private key to obtain the target encryption key.

The reading unit 712 is further configured to, based on the key identifier of the target encryption key, read the corresponding target encrypted shard from the data storage center, decrypt it using the target encryption key to obtain the corresponding target plaintext shard.

The computation unit 714 is configured to compute on the target plaintext shard and other plaintext shards based on the first computation logic.

Optionally, the apparatus can further comprise:

A determination unit 716, configured to determine, from the multiple trusted computing nodes, a second computing node belonging to the same role category as the first computing node.

A sharing unit 718, configured to share the target encryption key with the second computing node, so that the second computing node obtains authorization to compute the target encrypted shard based on the first computation logic.

The functions of the functional modules of the apparatus in the above embodiments can be implemented through the steps of the method embodiments. Therefore, the specific working process of the apparatus provided in an embodiment is not repeated here.

The apparatus for obtaining data authorization provided in an embodiment can obtain corresponding data authorization from the data provider while saving communication costs.

Figure 8:
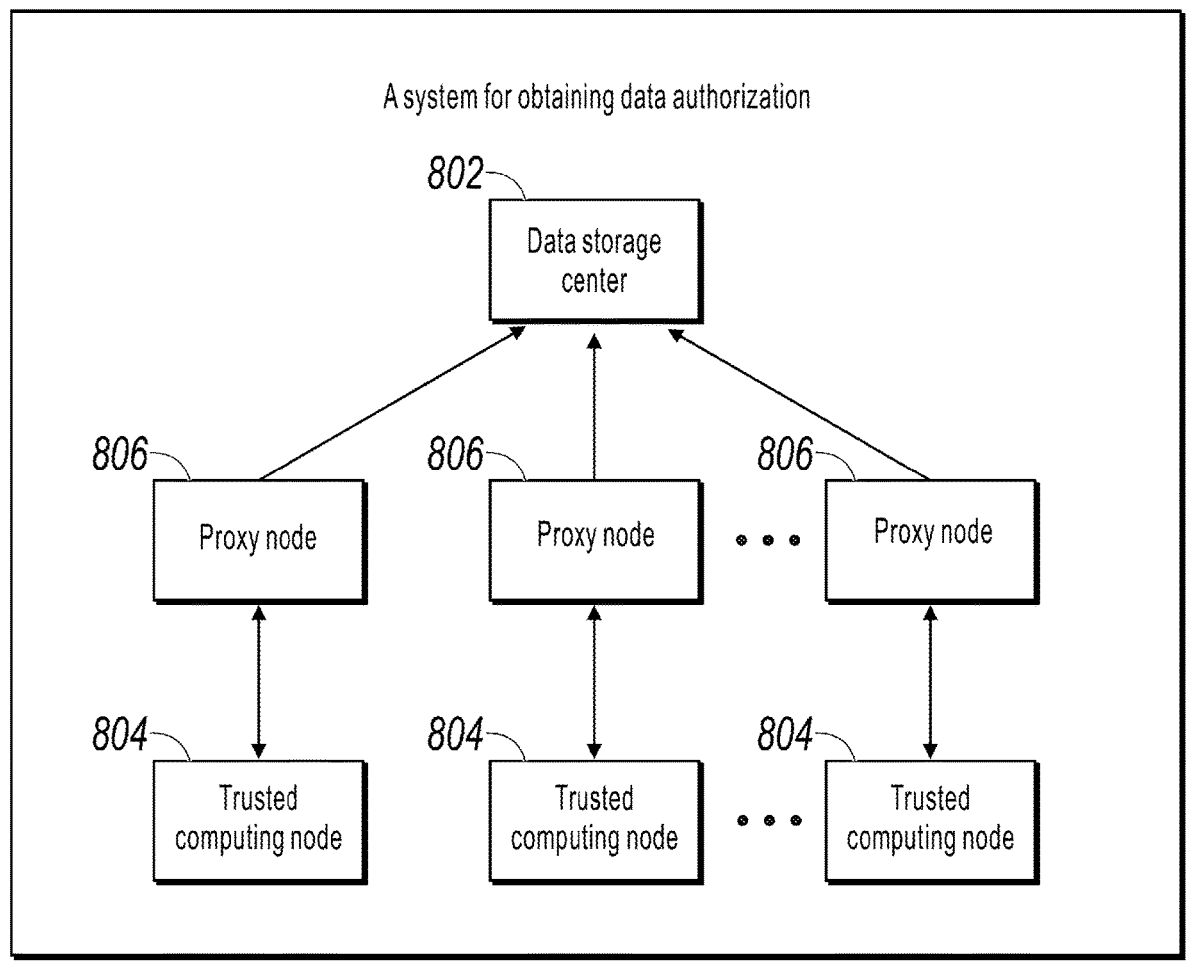
FIG. 8 shows a schematic diagram of a system for obtaining data authorization according to an embodiment.

Corresponding to the above method for obtaining data authorization, an embodiment of the present disclosure also provides a system for obtaining data authorization. As shown in FIG. 8, the system comprises a data storage center 802, multiple trusted computing nodes 804, and respective proxy nodes 806. The data storage center 802 maintains at least multiple encrypted shards of the first private data of the first provider.

Each proxy node 806 is configured to obtain from the first provider the encryption keys corresponding to the multiple encrypted shards.

Any first proxy node 806 among the proxy nodes is configured to send an authentication request to the corresponding first computing node 804, and receive authentication information returned by the first computing node 804, wherein the authentication information comprises at least a first code hash of a first computation logic running on the first computing node 804.

The first proxy node 806 is further configured to perform trusted authentication on the first computing node 804 based on the authentication information, and determine whether the first code hash is verifiably stored.

The first proxy node 806 is specifically configured to:

Obtain a certificate of verifiable storage pre-stored on the first computing node 804, wherein the certificate of verifiable storage includes at least a second code hash of the first computation logic;

Compare the first code hash with the second code hash, and if the comparison result matches, determine that the first code hash is verifiably stored.

The certificate of verifiable storage is received and forwarded to the first computing node 804 by a third party or administrator recognized by the system after the second code hash is provided to the verifiable storage center.

The first proxy node 806 is further configured to establish a first trusted channel with the first computing node 804 when the trusted authentication passes and the first code hash is verifiably stored.

The first proxy node 806 is further configured to send the received target encryption key to the first computing node 804 through the first trusted channel.

The first computing node 804 is configured to obtain authorization to compute the target encrypted shard corresponding to the target encryption key based on the first computation logic.

Optionally, the system further comprises a code storage center, which maintains at least the first computation logic.

The code storage center is configured to receive from the first provider a data retrieval request, which includes at least a second code hash obtained by the first provider from the verifiable storage center.

The code storage center is further configured to provide, in response to the data retrieval request, the first computation logic to the first provider for the first provider to review the legitimacy of the first computation logic.

The functions of the functional modules of the system in the above embodiments can be implemented through the steps of the method embodiments. Therefore, the specific working process of the system provided in an embodiment is not repeated here.

The system for obtaining data authorization provided in an embodiment can obtain corresponding data authorization from the data provider while saving communication costs.

Figure 9:
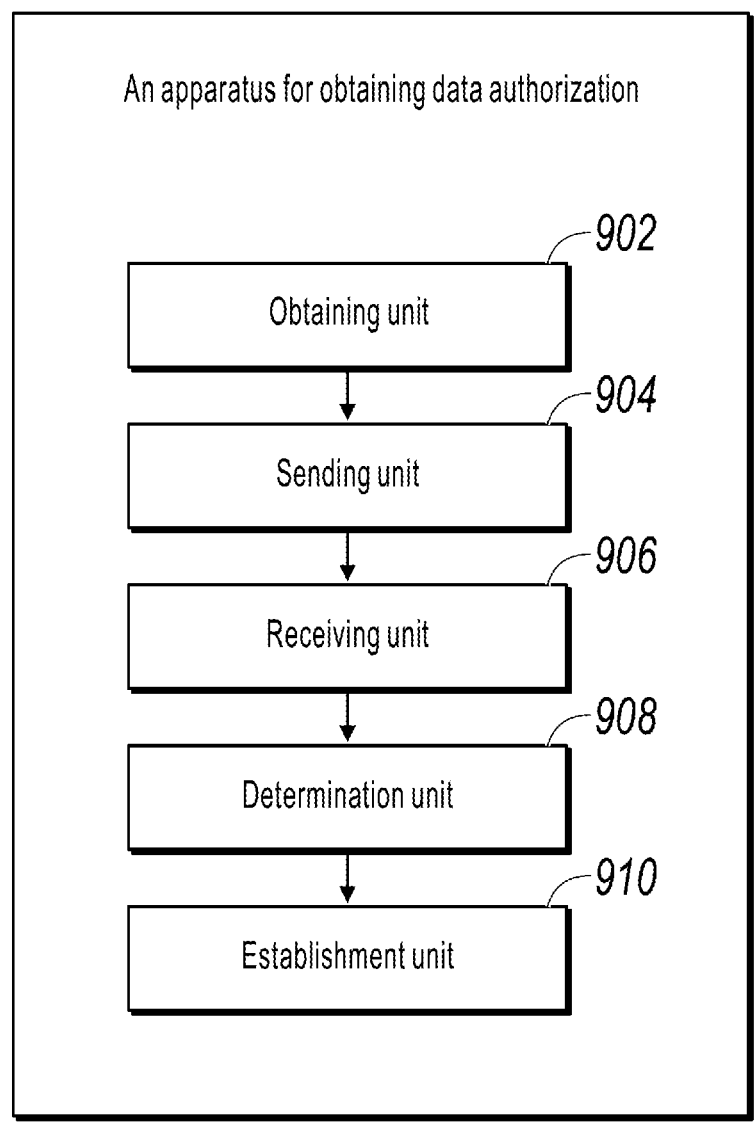
FIG. 9 shows a schematic diagram of an apparatus for obtaining data authorization according to another embodiment.

Corresponding to the above method for obtaining data authorization, one embodiment of this specification also provides an apparatus for obtaining data authorization, disposed in any first proxy node in a trusted computing center. The trusted computing center includes a data storage center, multiple trusted computing nodes and corresponding proxy nodes. The data storage center at least maintains multiple encrypted shards of first private data of a first provider. As shown in FIG. 9, the apparatus comprises:

An obtaining unit 902, configured to obtain a target encryption key from the respective encryption keys corresponding to the plurality of encrypted shards from the first provider.

A sending unit 904, configured to send an authentication request to the corresponding first computing node.

A receiving unit 906, configured to receive authentication information returned by the first computing node, wherein the authentication information comprises at least a first code hash of a first computation logic running on the first computing node.

A determination unit 908, configured to perform, based on the authentication information, trusted authentication on the first computing node, and determine whether the first code hash is verifiably stored.

An establishment unit 910, configured to establish a first trusted channel with the first computing node when the trusted authentication passes and the first code hash is verifiably stored.

The sending unit 904 is further configured to send the target encryption key to the first computing node through the first trusted channel, so that the first computing node obtains authorization to compute the target encrypted shard corresponding to the target encryption key based on the first computation logic.

The functions of the functional modules of the apparatus in the above embodiments can be implemented through the steps of the method embodiments. Therefore, the specific working process of the apparatus provided in an embodiment is not repeated here.

The apparatus for obtaining data authorization provided in an embodiment can obtain corresponding data authorization from the data provider while saving communication costs.

According to another aspect, a computer readable storage medium is also provided, storing a computer program which, when executed by a computer, causes the computer to perform the method described in connection with any one of FIGS. 4 to 6.

According to yet another aspect, a computing device is provided, comprising a memory and a processor, wherein the memory stores executable code which, when executed by the processor, implements the method described in connection with any one of FIGS. 4 to 6.

The embodiments in the present disclosure are described in a progressive manner. The same or similar parts of the embodiments can refer to each other. Each embodiment focuses on the differences from other embodiments. In particular, for apparatus embodiments, since they are basically similar to method embodiments, the description is relatively simple, and reference can be made to relevant parts of the method embodiments.

The steps of the methods or algorithms described in combination with the disclosed content of this specification can be implemented in a hardware manner, or can be implemented by a processor executing software instructions. The software instructions can include corresponding software modules, and the software modules can be stored in RAM memory, flash memory, ROM memory, EPROM memory, EEPROM memory, registers, hard disk, mobile hard disk, CD-ROM, or any other form of storage medium known to those skilled in the art. An exemplary storage medium is coupled to a processor to enable the processor to read information from the storage medium and write information to the storage medium. Of course, the storage medium may also be a part of the processor. The processor and storage medium may be located in an ASIC. Additionally, the ASIC may be located in a server. Of course, the processor and storage medium may also exist in the server as separate components.

Those skilled in the art should recognize that in one or more of the above examples, the functions described in the present invention can be implemented using hardware, software, firmware, or any combination thereof. When implemented using software, these functions can be stored on a computer-readable medium or transmitted on a computer-readable medium as one or more instructions or code. Computer readable media includes computer storage media and communication media, where communication media includes any medium that facilitates transfer of computer programs from one place to another. Storage media can be any available media accessible by a general purpose or special purpose computer.

The above describes specific embodiments of this specification. Other embodiments are within the scope of the appended claims. In some cases, the actions or steps recited in the claims may be performed in a different order than in the embodiments and still achieve the desired results. Additionally, the processes depicted in the figures do not necessarily require the specific order or sequential order shown in order to achieve desirable results. In certain embodiments, multitasking and parallel processing may be possible or advantageous.

The above specific implementation manners further detail the objectives, technical solutions, and beneficial effects of this specification, and it should be understood that the above descriptions are merely specific implementation manners of this specification and are not intended to limit the protection scope of this specification. Any modifications, equivalent replacements, improvements, etc. made on the basis of the technical solutions of this specification shall fall within the protection scope of this specification.

What is claimed is:

1. A computer-implemented method for obtaining data authorization, comprising:

receiving, by a first computing node among a plurality of trusted computing nodes of a trusted computing center, an authentication request from a first provider, wherein the trusted computing center comprises a data storage center and the plurality of trusted computing nodes, and the data storage center maintains at least plurality of encrypted shards of first private data of the first provider;

returning authentication information to the first provider, wherein the authentication information comprises at least a first code hash corresponding to a first computation logic running on the first computing node, wherein the first computation logic is configured to compute a target encrypted shard corresponding to a target encryption key, wherein the first code hash is generated based on a program code of the first computation logic, and wherein the first code hash is used to verify legitimacy of the first computation logic;

receiving a channel establishment request sent by the first provider after it is determine that the first computing node has passed trusted authentication and the first code hash has passed correctness verification;

establishing a first trusted channel with the first provider based on the channel establishment request; and obtaining, via the first trusted channel, the target encryption key from respective encryption keys corresponding to the plurality of encrypted shards, thereby obtaining authorization to compute the target encrypted shard corresponding to the target encryption key based on the first computation logic.

2. The computer-implemented method according to claim 1, further comprising:

encrypting, by the first computing node, the target encryption key using a private key corresponding to the first computing node and the first computation logic to obtain an encrypted target encryption key; and storing the encrypted target encryption key in the data storage center.

3. The computer-implemented method according to claim 2, wherein the trusted computing center further comprises a management center for managing the plurality of trusted computing nodes, the data storage center also maintains respective key identifiers corresponding to the plurality of encrypted shards; and the computer-implemented method further comprises:

receiving, by the first computing node, a computation request from the management center;

in response to the computation request, reading the encrypted target encryption key from the data storage center, decrypting the encrypted target encryption key using a decryption key corresponding to the private key to obtain the target encryption key;

based on a key identifier of the target encryption key, reading a corresponding target encrypted shard from the data storage center;

decrypting the corresponding target encrypted shard using the target encryption key to obtain a corresponding target plaintext shard; and computing the corresponding target plaintext shard based on the first computation logic.

4. The computer-implemented method according to claim 1, further comprising:

determining, by the first computing node from the plurality of trusted computing nodes, a second computing node belonging to a same role category as the first computing node; and sharing the target encryption key with the second computing node, causing the second computing node to obtain authorization to compute the target encrypted shard based on the first computation logic.

5. The computer-implemented method according to claim 1, wherein the correctness verification comprises comparing the first code hash with a target code hash of a target computation logic that is pre-stored and reviewed by the first provider.

6. A computer-implemented method for obtaining data authorization, comprising:

obtaining, by a first proxy node of a trusted computing center from a first provider, encryption keys corresponding to a plurality of encrypted shards, wherein the trusted computing center comprises a data storage center, a plurality of trusted computing nodes, and proxy nodes corresponding to the plurality of trusted computing nodes, and the data storage center maintains at least plurality of encrypted shards of first private data of the first provider;

sending, by the first proxy node among the proxy nodes, an authentication request to a corresponding first computing node;

receiving, by the first proxy node, authentication information returned by the first computing node, wherein the authentication information comprises at least a first code hash corresponding to a first computation logic running on the first computing node, wherein the first computation logic is configured to compute a target encrypted shard corresponding to a target encryption key, wherein the first code hash is generated based on a program code of the first computation logic, and wherein the first code hash is used to verify legitimacy of the first computation logic;

performing, by the first proxy node based on the authentication information, trusted authentication on the first computing node;

determining, by the first proxy node, whether the first code hash is verifiably stored;

in response to that the trusted authentication passes and the first code hash is verifiably stored, establishing, by the first proxy node, a first trusted channel with the first computing node; and sending, by the first proxy node, the target encryption key to the first computing node through the first trusted channel.

7. The computer-implemented method according to claim 6, further comprising:

obtaining, by the first computing node, authorization to compute the target encrypted shard corresponding to the target encryption key based on the first computation logic.

8. The computer-implemented method according to claim 6, wherein determining whether the first code hash is verifiably stored comprises:

obtaining from the first computing node a certificate of verifiable storage that is pre-stored in the first computing node, wherein the certificate of verifiable storage includes at least a second code hash of the first computation logic;

comparing the first code hash with the second code hash; and in response to that the first code hash matches with the second code hash, determining that the first code hash is verifiably stored.

9. The computer-implemented method according to claim 8, wherein the certificate of verifiable storage is received and forwarded to the first computing node by a third party or administrator recognized by the trusted computing center after the second code hash is provided to a verifiable storage center.

10. The computer-implemented method according to claim 9, wherein the trusted computing center further comprises a code storage center that maintains at least the first computation logic; and the computer-implemented method further comprises:

receiving, by the code storage center, a data retrieval request from the first provider, wherein the data retrieval request comprises at least the second code hash obtained by the first provider from the verifiable storage center; and in response to the data retrieval request, providing, by the code storage center, the first computation logic to the first provider for the first provider to review legitimacy of the first computation logic.

11. A system for obtaining data authorization, comprising:

a data storage center, wherein the data storage center comprises at least one first processor and at least one first memory, and wherein the at least one first memory stores first programming instructions for execution by the at least one first processor;

a plurality of trusted computing nodes, wherein each of the plurality of trusted computing nodes comprises at least one second processor and at least one second memory, and wherein the at least one second memory stores second programming instructions for execution by the at least one second processor; and a plurality of proxy nodes corresponding to the plurality of trusted computing nodes, wherein each of the plurality of proxy nodes comprises at least one third processor and at least one third memory, and wherein the at least one third memory stores third programming instructions for execution by the at least one third processor;

wherein the data storage center is configured to:

maintain at least a plurality of encrypted shards of first private data of a first provider;

wherein the plurality of proxy nodes are configured to:

obtain, from the first provider, encryption keys corresponding to the plurality of encrypted shards;

wherein at least a first proxy node among the plurality of proxy nodes is configured to:

send an authentication request to a corresponding first computing node, and receive authentication information returned by the first computing node, wherein the authentication information at least comprises a first code hash corresponding to a first computation logic running in the first computing node, wherein the first computation logic is configured to compute a target encrypted shard corresponding to a target encryption key, wherein the first code hash is generated based on a program code of the first computation logic, and wherein the first code hash is used to verify legitimacy of the first computation logic;

perform trusted authentication on the first computing node based on the authentication information;

determine whether the first code hash is verifiably stored;

in response to determining that the trusted authentication passes and the first code hash is verifiably stored, establish a first trusted channel with the first computing node; and send the target encryption key to the first computing node through the first trusted channel.

12. The system according to claim 11, wherein the first computing node is configured to obtain authorization to perform computation on the target encrypted shard corresponding to the target encryption key based on the first computation logic.

13. The system according to claim 11, wherein the first proxy node is configured to:

obtain a certificate of verifiable storage pre-stored in the first computing node, wherein the certificate of verifiable storage at least comprises a second code hash of the first computation logic; and compare the first code hash with the second code hash, and if the first code hash with the second code hash matches, determine that the first code hash is verifiably stored.

14. The system according to claim 13, wherein the certificate of verifiable storage is received and forwarded to the first computing node by a trusted third party or administrator after the trusted third party or administrator provides the second code hash to a verifiable storage center.

15. The system according to claim 14, wherein the system further comprises a code storage center that maintains at least the first computation logic;

the code storage center is configured to receive a data acquisition request from the first provider, wherein the data acquisition request at least comprises the second code hash acquired by the first provider from the verifiable storage center; and the code storage center is further configured to provide the first computation logic to the first provider in response to the data acquisition request for the first provider to review legitimacy of the first computation logic.

16. The system according to claim 11, wherein the first computing node is configured to:

receive the authentication request from the first provider;

return authentication information to the first provider, wherein the authentication information comprises at least the first code hash of the first computation logic running on the first computing node;

receive a channel establishment request sent by the first provider after it is determined that the first computing node has passed the trusted authentication and the first code hash has passed correctness verification;

establish a second trusted channel with the first provider based on the channel establishment request; and obtain, via the second trusted channel, a second target encryption key from the encryption keys corresponding to the plurality of encrypted shards, thereby obtaining authorization to compute a second target encrypted shard corresponding to the second target encryption key based on the first computation logic.

17. The system according to claim 16, wherein the first computing node is configured to:

encrypt the target encryption key using a private key corresponding to the first computing node and the first computation logic to obtain an encrypted target encryption key; and store the encrypted target encryption key in the data storage center.

18. The system according to claim 17, wherein the system further comprises a management center for managing the plurality of trusted computing nodes, the data storage center also maintains respective key identifiers corresponding to the plurality of encrypted shards; and the first computing node is configured to:

receive a computation request from the management center;

in response to the computation request, read the encrypted target encryption key from the data storage center, decrypt the encrypted target encryption key using a decryption key corresponding to the private key to obtain the target encryption key;

based on a key identifier of the target encryption key, read a corresponding target encrypted shard from the data storage center;

decrypt the corresponding target encrypted shard using the target encryption key to obtain a corresponding target plaintext shard; and compute the corresponding target plaintext shard based on the first computation logic.

19. The system according to claim 16, wherein the first computing node is configured to:

determine a second computing node belonging to a same role category as the first computing node; and share the target encryption key with the second computing node.

20. The system according to claim 19, wherein the second computing node is configured to obtain authorization to compute the second target encrypted shard based on the first computation logic.

\* \* \* \* \*